(12) United States Patent
Hong

(10) Patent No.: US 7,040,563 B2
(45) Date of Patent: May 9, 2006

(54) REEL BRAKE MECHANISM FOR A MAGNETIC TAPE APPARATUS

(75) Inventor: Sung Pyo Hong, Suwon-si (KR)

(73) Assignee: LG Electronics Inc., Seoul (KR)

( * ) Notice: Subject to any disclaimer, the term of this patent is extended or adjusted under 35 U.S.C. 154(b) by 169 days.

(21) Appl. No.: 10/626,711

(22) Filed: Jul. 25, 2003

(65) Prior Publication Data

US 2004/0149847 A1    Aug. 5, 2004

(30) Foreign Application Priority Data

Jul. 27, 2002    (KR) .................... 10-2002-0044455

(51) Int. Cl.
*B65H 59/38*    (2006.01)
(52) U.S. Cl. .................................... 242/334
(58) Field of Classification Search ............... 242/334, 242/340, 343, 344, 333.5, 355, 355.1, 355.2, 242/422.1; 360/85, 95, 96.1, 96.3
See application file for complete search history.

(56) References Cited

U.S. PATENT DOCUMENTS

| | | | | | |
|---|---|---|---|---|---|
| 4,561,608 | A | * | 12/1985 | O'Gwynn et al. | 242/333.5 |
| 4,635,146 | A | * | 1/1987 | Koda et al. | 360/85 |
| 4,661,864 | A | * | 4/1987 | Kuwajima | 360/85 |
| 4,685,008 | A | * | 8/1987 | Ohyama | 360/85 |
| 4,796,116 | A | * | 1/1989 | Kwon et al. | 360/85 |
| 4,899,951 | A | * | 2/1990 | Okada et al. | 242/355.2 |
| 5,114,093 | A | * | 5/1992 | Kunimaru et al. | 242/355.1 |
| 5,465,921 | A | * | 11/1995 | Cheon | 242/355.1 |
| 5,485,324 | A | * | 1/1996 | Do et al. | 360/85 |
| 5,758,835 | A | * | 6/1998 | Annen et al. | 242/334 |

* cited by examiner

*Primary Examiner*—William A. Rivera
(74) *Attorney, Agent, or Firm*—Fleshner & Kim, LLP

(57) ABSTRACT

Embodiments of the present invention relates to an apparatus including a real engagement portion, a first brake, and a second brake. The first brake is configured to be selectively coupled to the first reel engagement portion. The second brake is configured to be selectively configured to the first reel engagement portion.

25 Claims, 10 Drawing Sheets

REEL BRAKE MECHANISM FOR A MAGNETIC TAPE APPARATUS

BACKGROUND OF THE INVENTION

1. Field of the Invention

Embodiments of the present invention generally relates to a magnetic tape recording and/or reproducing apparatus.

2. Background of the Related Art

Magnetic tape recording and/or reproducing apparatuses (e.g. video cassettes, audio cassettes, and/or micro audio cassette) may be used to record information (e.g. audio signals or video signals). Some cassettes which hold tape for use in a tape recording and/or reproducing apparatus have two reels. As the tape is played, the tape is moved from one reel to another. Additionally, many magnetic tape recording and/or reproducing apparatuses have a function to rewind tape at a relatively high speed. In other words, the two reels in the cassette are moved very quickly so the tape is transferred from one reel to the other.

However, some limitations do exist in some tape recording and/or reproducing apparatuses. If during a rewind or fast forward operation, the operation is suddenly stopped, there is a possibility that the tape could be damaged. This phenomenon may occur because significantly more tape is on one reel of the tape cassette than the other reel of the tape cassette. Accordingly, each of the two reels will take a different amount of time to be stopped if the same braking forces apply to each of these reels during a stopping operation. Because the two reels will take different amounts of time to stop, the tape may be damaged. In some circumstances, the tape actually may become unwound from the tape cassette inside the tape playing and/or reproducing apparatus, thereby damaging the tape. In other circumstances, too much tension may be applied to the tape and the tape may actually break or be damaged through stretching. Accordingly, there has been a long felt need to prevent tape from being damaged in a tape apparatus, when a fast forward or rewind mode is stopped.

SUMMARY OF THE INVENTION

Embodiments of the present invention relates to an apparatus including a real engagement portion, a first brake, and a second brake. The first brake is configured to be selectively coupled to the first reel engagement portion. The second brake is configured to be selectively configured to the first reel engagement portion.

In exemplary embodiments, a reel of the tape apparatus will have at least two brakes that can be selectively applied to one of two reels in a tape apparatus. In a circumstance where the amount of tape on two reels in a tape apparatus is not equal, an appropriate combination of two brakes is applied so that the stopping time of a first reel and a second reel is approximately the same. Accordingly, since the stopping time of the first reel and the second reel is substantially the same, tape will not be damaged when a rewind or fast forward operation is stopped. For example, if much more tape is wound on a first reel than a second reel, then two brakes may be applied to the first reel when a rewind or fast forward operation is stopped, because the first reel has a greater inertial force than the second reel. Alternately, if much less tape is wound on a first reel than a second reel, then only one brake may be applied to the first reel when a rewind or fast forward operation is stopped. This is appropriate, as the first reel will have a smaller inertial force than the second reel, then the first reel will require a smaller braking force than the braking force needed for the second reel to have substantially the same stopping time. Embodiments of the present invention are advantageous, as tape will not be damaged when a rewind mode or fast forward mode is stopped.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

DETAILED DESCRIPTION OF PREFERRED EMBODIMENTS

A magnetic tape recording and/or reproducing apparatus, (e.g., a video tape recorder) may record signals on a tape and/or reproduce recorded signals on the tape by running a tape (serving as a recording medium) along a tape running system. A tape may be used in a tape cassette and loaded on a deck of a magnetic tape recording and/or reproducing apparatuses. Tape may be run along a tape running system in accordance with various operation modes (e.g., a reproducing mode, a recording mode, a high-speed forward running mode, and a high-speed backward running mode). A high-speed forward running mode may be referred to as FF (Fast Forward) mode. A high-speed backward running mode may be referred to as a REW (Rewind) mode.

Figure 1:
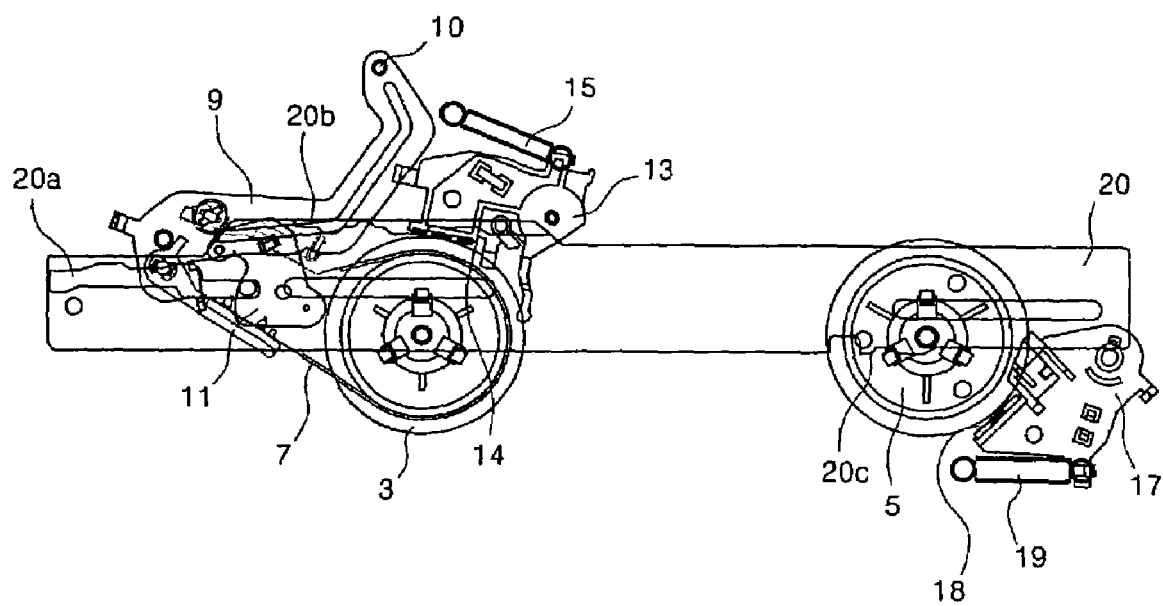
FIG. 1 is an exemplary view of a reel brake mechanism in a magnetic tape recording and/or reproducing apparatus.
Figure 2:
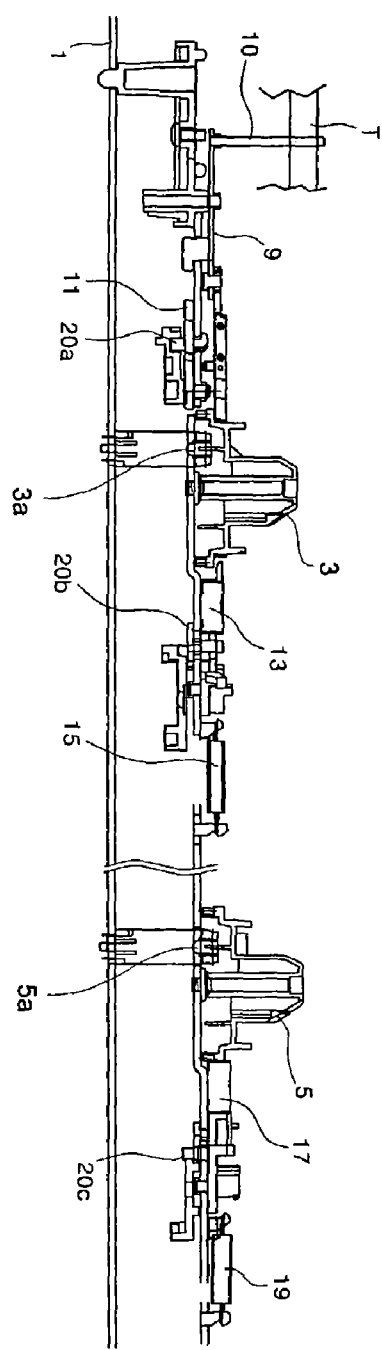
FIG. 2 is an exemplary cross-sectional view of a reel brake mechanism in a magnetic tape recording and/or reproducing apparatus.

FIGS. 1 and 2 are exemplary illustrations of a reel brake mechanism in a magnetic tape recording and/or reproducing apparatus. Supply reel 3 and or take-up reel 5 may be installed on main chassis 1 and may be spaced from each other by a designated distance. Supply reel 3 and the take-up reel 5 may be selectively driven by receiving a driving force of a driving source (not shown). Tape (T) may be run within a tape cassette from one reel to another reel.

Tension band 7 may be wound on supply reel 3. Both terminals of tension band 7 may be connected to tension arm 9. Tension arm 9 may be installed on the main chassis 1. Tension post 10 may be for adjusting a tension of tape (T) installed on a front end of tension arm 9. Tension post 10 may contact one surface of running tape (T) and may control a degree of close contact between tension band 7 and supply reel 3 in accordance with tension of tape (T). Tension post 10 may adjust the tension of tape (T). Reference numeral "11" may denote a tension lever for controlling operation of tension arm 9. Reference numeral "3a" may denote a sensor for sensing an amount of tape (T) wound on supply reel 3. Reference numeral "5a" may denote a sensor for sensing an amount of tape (T) wound on take-up reel 5. A braking force may be used to stop rotation of supply reel 3.

Supply reel brake unit 13 may be installed at a designated location on main chassis 1 near supply reel 3. Supply reel brake unit 13 may include a friction member 14 formed at one side. Supply reel brake unit 13 may control rotational speed of supply reel 3 by bringing friction member 14 into close contact with the outer circumference of supply reel 3. Supply reel brake unit 13 may be supported by spring 15. Supply reel brake unit 13 may supply a braking force by an elastic force of spring 15.

Rotational speed of take-up reel 5 may be controlled. Take-up reel brake unit 17 may be installed on main chassis 1 neat take-up reel 5. Take-up reel brake unit 17 may include friction member 18 formed at one side. Take-up reel brake unit 17 may, control rotational speed of take-up reel 5 by selectively bringing friction member 18 into close contact with the outer circumference of take-up reel 5. One side of take-up reel brake unit 17 may be supported by spring 19.

Function plate 20 may be provided on main chassis 1. Cams 20a, 20b, and 20c may be for selectively operating at least one of tension lever 11, supply reel brake unit 13, and take-up reel brake unit 17. Cams 20a, 20b, 20c may operate according to operation modes of a magnetic tape recording and/or reproducing apparatus installed on function plate 20. Running of tape (T) may be achieved by selectively rotating supply reel 3 and take-up reel 5. FF mode and REW mode may be carried out by speeding up rotation of supply reel 3 and take-up reel 5.

A degree of close contact between tension band 7 and supply reel 3 may be changed by the tension of tape (T) transmitted by the tension post 10. The tension of tape (T) may be adjusted. Supply reel brake unit 13 and take-up reel brake unit 17 may be selectively in close contact with supply reel 3 and take-up reel 5, thereby stopping the running of tape (T).

The exemplary reel brake mechanism illustrated in FIGS. 1 and 2 may have some limitations. The exemplary reel brake mechanism illustrated in FIGS. 1 and 2 may be useful in FF or REW modes at relatively low speeds. However, the exemplary reel brake mechanism illustrated in FIGS. 1 and 2 may not be proper at relatively high speeds, (e.g., more than 500 times-speed). 500 times-speed may be defined as 43.2 seconds to wind a video tape with a normal playing time of 120 minutes in standard play mode and 360 minutes in an extended play mode, from beginning to end. A speed whereby the tape with the aforementioned length is wound in 1 minute is 360 times-speed.

An amount of tape (T) wound on take-up reel 5 may be more than an amount of tape (T) wound on supply reel 3. When tape (T) is in a REW mode and running of tape (T) is stopped at an early stage of the REW mode, tape (T) may become unwound from take-up reel 5. This unwinding may be due to greater inertia of take-up reel 5 than supply reel 3 due to a relatively large amount of tape wound on take-up reel 5. Likewise, this problem may also exist when an amount of tape (T) wound on supply reel 3 is mote than that wound on take-up reel 5, when tape (T) is in a FF mode and running of tape (T) is stopped at an early stage of the FF mode.

When running of tape (T) is stopped at a later stage of REW mode (e.g., in a condition that an amount of tape (T) wound on supply reel 3 is more than that wound on take-up reel 5 by running the tape (T) at a high-speed in backward direction), tape m wound on take-up reel 5 may experience an inertial force of the supply reel 3, thereby generating a noise due to the force and damaging tape (T). Likewise, this problem may also occur at a later stage of a FF mode.

Figure 3:
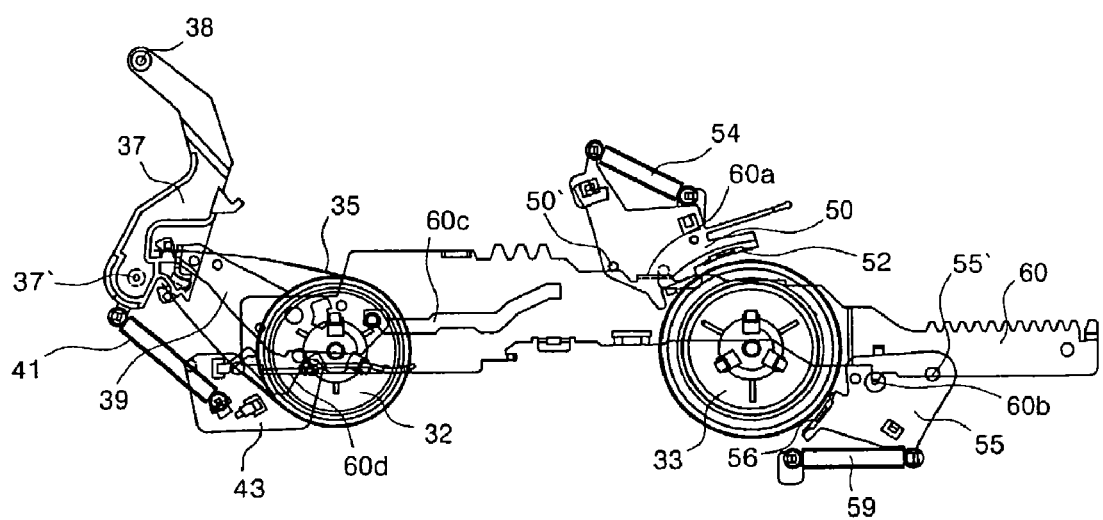
FIG. 3 is an exemplary view of a reel brake mechanism in a magnetic tape recording and/or reproducing apparatus.
Figure 4A:
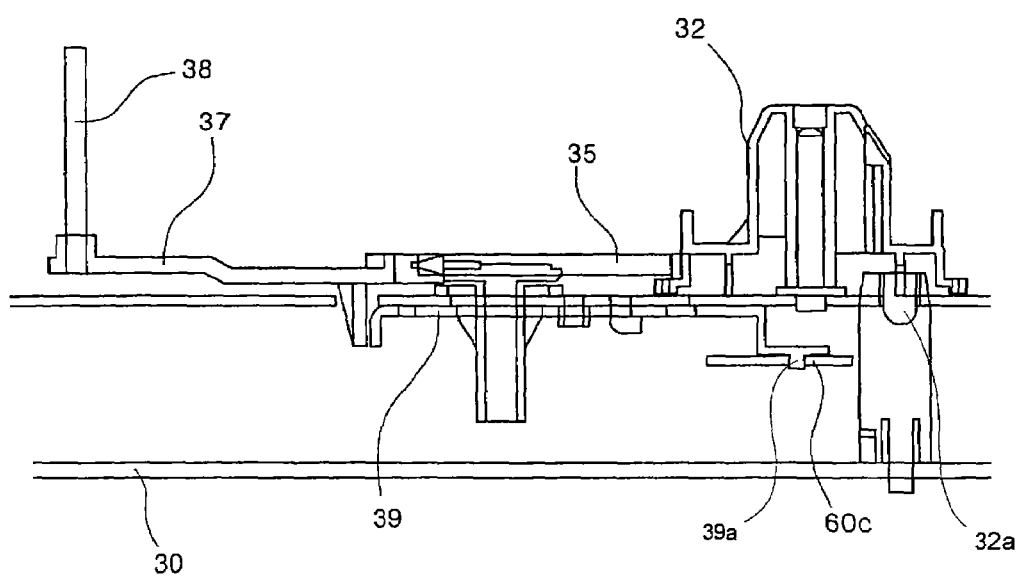
FIGS. 4A to 4C are exemplary partial cross-sectional views of a reel brake mechanism.
Figure 4B:
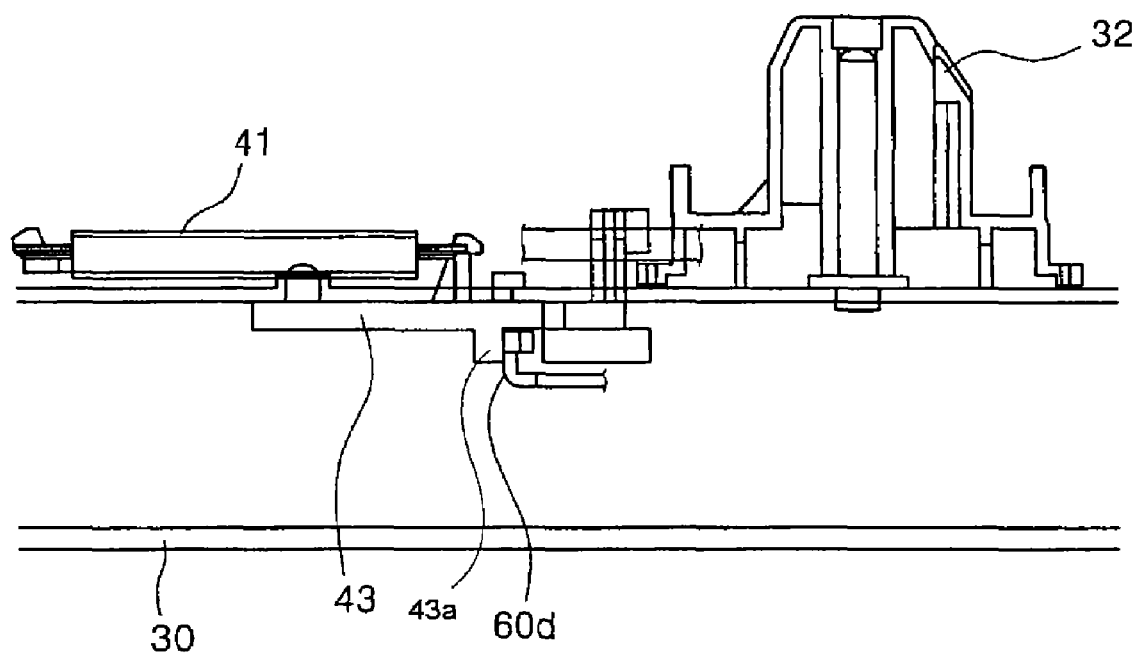
Figure 4C:
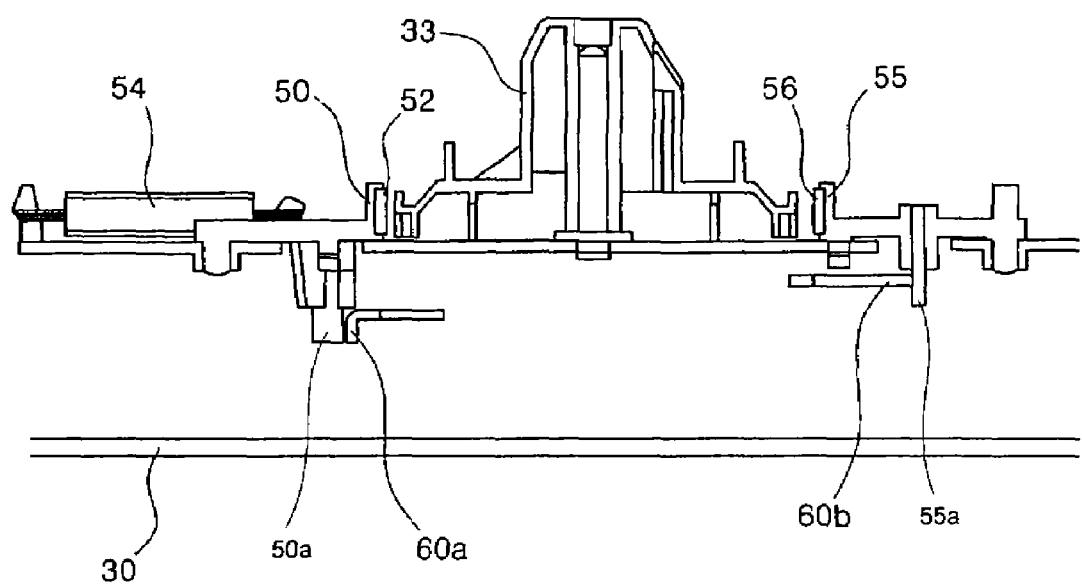
Figure 5:
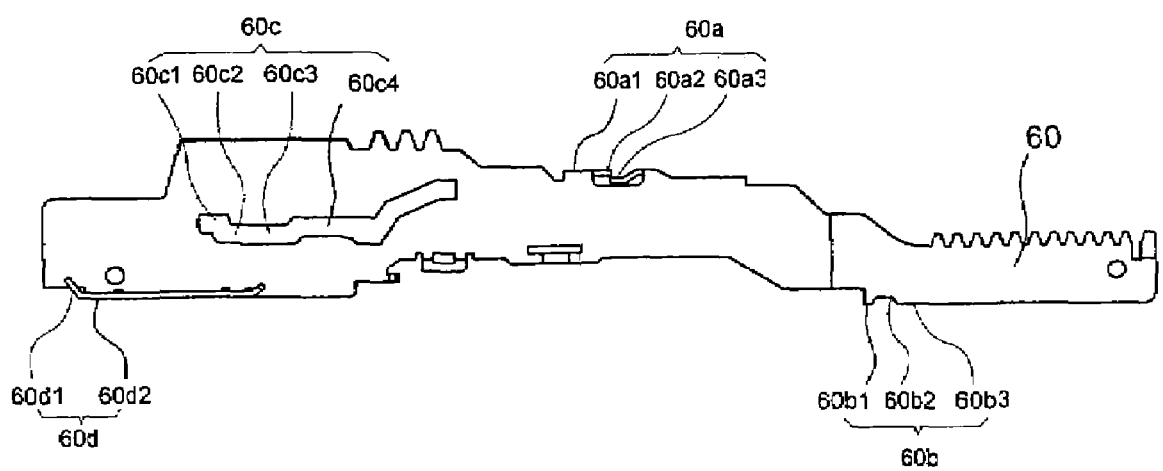
FIG. 5 is an exemplary schematic view of a function plate of the reel brake mechanism.

FIG. 3 is an exemplary view of a reel brake mechanism in a magnetic tape recording and/or reproducing apparatus in accordance with embodiments of the present invention. FIGS. 4A to 4C ate exemplary partial cross-sectional views of a reel brake mechanism in a magnetic tape recording and/or reproducing apparatus. FIG. 5 is an exemplary schematic view of a function plate of a reel brake mechanism.

Supply reel 32 and take-up reel 33 may be installed on main chassis 30 and may be spaced from each other by a designated distance. Supply reel 32 and take-up reel 33 may be selectively rotated by respectively receiving a driving force of a capstan motor (not shown) serving as a driving force, thereby rotating tape reels of a tape cassette. A supply reel sensor and a take-up reel sensor (not shown) may be for sensing an amount of tape wound on corresponding tape reels of a tape cassette by supply reel 32 and take-up reel 33. A supply reel sensor and a take-up reel sensor may be installed below supply reel 32 and take-up reel 33.

Tension band 35 may be for controlling rotation of supply reel 32 and may be for adjusting tension of running tape m installed at a designated location on main chassis 30 neat supply reel 32. Tension band 35 wound on outer circumference of supply reel 32. Tension band 35 may control rotational speed of supply reels 32 in accordance with a degree of friction with the outer circumference of supply reel 32. Both terminals of tension band 35 may be connected to tension arm 37 installed on main chassis 30.

Tension arm 37 may be rotably installed on main chassis 30, centering around its rotational axis 37'. Tension post 38 may be installed on a front end of tension arm 27. Tension post 38 contacts one surface of running tape (T) and may change the degree of friction between tension band 35 and supply reel 32 in accordance with the tension of tape (T). Driving of tension arm 37 may be controlled by a tension lever 39 installed on main chassis 30. In standard play mode, FF mode, and REW mode, the position of tension arm 37 may be determined by tension lever 39. Operation of tension band 35 may be controlled by the position of tension arm One end of tension spring 41 may be connected to tension arm 37. Tension spring 41 may apply an elastic force to tension arm 37. Another end of tension spring 41 may be connected to spring lever 43. Spring lever 43 may change the elastic force of tension spring 41 by function plate 60 (described below) in accordance with operation modes. Spring lever 43 may change a braking force supplied to supply reel 32 via tension band 37. In embodiments, spring lever 43 may change the length of the tension spring 41 to change the elastic force applied to tension arm 37. Brake force supplied by tension band 35, in accordance with operation modes of a tape (e.g., standard play mode, FF modes and/or REW modes). A braking force for uniformly maintaining tension of a tape in standard play mode and a braking force for stopping the tape in the FF mode or REW mode may be set differently.

In embodiments, In order to control rotational speed of take-up reel 33, first take-up reel brake unit 50 may be installed on main chassis 30 near take-up reel 33. First take-up reel brake unit 50 may be rotably installed on main chassis 30 centering around its rotational axis 50'. First take-up reel brake unit 50 may be provided with friction member 52 formed at one end. In embodiments, friction member 52 is made of felt. Friction member 52 may be selectively in close contact with the outer circumference of take-up reel 33. Brake spring 54 may be installed on one end of first take-up reel brake unit 50. One end of brake spring 54 may be connected to first take-up reel brake unit 50. Another end of brake spring 54 may be connected to main chassis 30. First take-up reel brake unit 50 may rotate by brake spring 54 in a clockwise direction (referred to FIG. 3) centered around rotational axis 50'. First take-up reel brake unit 50 may generate a braking force by the elastic force of brake spring 54.

In embodiments, in order to control rotational speed of take-up reel 33, second take-up reel brake unit 55 may be installed on main chassis 30 near take-up reel 33. Second take-up reel brake unit 55 may be rotably installed on main chassis 30 centered around its rotational axis 55'. Second take-up reel brake unit 55 may be provided with friction member 56 formed at one end. In embodiments, friction number 56 is made of felt. Friction member 56 may be selectively in close contact with the outer circumference of take-up reel 33. Second take-up reel brake unit 55 may rotate by brake spring 59 in a clockwise direction. One end of brake spring 59 may be connected to second take-up reel brake unit 55. Another end of brake spring 59 may be connected to main chassis 30.

A braking force of second take-up reel brake unit 55 may be determined by braking spring 59. In embodiments of the present invention, braking force of second take-up reel brake unit 55 may be smaller than a braking force of tension band 35. Braking force of second take-up reel brake unit 55 may be set to be the same as or larger than the braking force of first take-up reel brake unit 50. The total sum of braking forces of first braking unit 50 and second braking unit 55 may be larger than a braking force generated by tension band 35.

As illustrated in exemplary FIG. 5, function plate 60 may be installed on main chassis 30. A plurality of cams 60*a*, 60*b*, 60*c*, and/or 60*d* may be provided on function plate 60. Operations of first take-up reel brake unit 50, second take-up reel brake unit 55, tension lever 39, and spring lever 43 may be determined by cams 60*a*, 60*b*, 60*c*, and/or 60*d* in accordance with operation modes of a tape (e.g., standard play mode, FF mode, and REW mode). Cams 60*a*, 60*b*, 60*c*, and/or 60*d* of function plate 60 may be driven by a loading motor or a separate driving source in accordance with the operation modes of a tape, thereby determining their positions.

In embodiments, cams 60*a* and 60*b* which may be provided on function plate 60 may only drive first take-up reel brake unit 50 or simultaneously drive both first take-up reel brake unit 50 and second take-up reel brake unit 55 in accordance with operation modes of a tape. In embodiments, in order to stop running of tape (T) in FF and REW modes, braking force must be applied to both supply reel 32 and take-up reel 33. Braking force may be applied to supply reel 32 by tension band 35. Braking force may be applied to take-up reel 33 by first take-up reel brake unit 50 or both first take-up reel brake unit 50 and second take-up reel brake unit 55. Cams 60*c* and 60*d* may be provided on function plate 60 and may rotate spring lever 43 in a clockwise or counter-clockwise direction in accordance with the operation mode of a tape, thereby changing the tension of tape m applied by tension band 35.

In a FF mode or REW mode, cams 60*a*1 and 60*b*1 which may be provided on function plate 60 may contact downward protrusion 50*a* of first take-up reel brake unit 50 and the downward protrusion 55*a* of second take-up reel brake unit 55. Downward protrusion 43*a* of spring lever 43 may be located on a left-side of cam 60*d*1 provided on function plate 60. Downward protrusion 39*a* of tension lever 39 may be inserted in cam 60*c*1 provided on function plate 60. In embodiments, since the working load of tension spring 41 is reduced by clockwise-direction rotation of spring lever 43, the tension of supply reel 32 actuated by tension band 35 may be released. For example, tension band 35 may not be in close contact with supply reel 32. First take-up reel brake unit 50 and second take-up reel brake unit 55 may be located on designated positions so that their braking forces are applied to the take-up reel 33.

In embodiments of the present invention, in a stopping operation of a FF mode or REW mode, the stopping operation may be divided into two modes. In a first mode, cams 60*a*2 and 60*b*2 which may be provided on function plate 60 may contact downward protrusion 50*a* of first take-up reel brake unit 50 and downward protrusion 55*a* of second take-up reel brake unit 55. Downward protrusion 43*a* of spring lever 43 may be located on the left-side of cam 60*d*1 provided on function plate 60. Downward protrusion 39*a* of tension lever 39 may be insetted in cam 60*c*2 provided on function plate 60. Tension lever 39 may actuate tension band 35 to apply tension to supply reel 32 to a certain extent. First take-up reel brake unit 50 may be located on a designated position so that its braking force is not applied to take-up reel 33. Second take-up reel brake unit 55 may be located on a designated position, so that its braking force is applied to take-up reel 33. At least one of first take-up reel brake unit 50 and second take-up reel brake units 55 may be actuated so that its braking force is applied to take-up reel 33.

In a second mode of stopping operation of FF mode or REW mode, locations of the downward protrusion 55*a*, downward protrusion 43*a*, and/or downward protrusion 39*a* may be identical to the first mode. However, cam 60*a*3 may alternatively provided on function plate 60 to contact downward protrusion 50*a* of first take-up reel brake unit 50. Tension lever 39 may actuate tension band 35 to apply tension to supply reel 32 to the same extent as the first mode. First take-up reel brake unit 50 and second take-up reel brake unit 55 may be located at positions so that their braking forces can be applied to take-up reel 33.

In standard play mode or record mode, cams 60*a*2, 60*b*3, and/or 60*d*2 may be provided on function plate 60 to contact downward protrusion 50*a* of first take-up reel brake unit 50. Downward protrusion 55*a* of second take-up reel brake unit 55, and/or downward protrusion 43*a* of spring lever 43. Downward protrusion 39*a* of tension lever 39 may be inserted in cam 60*c*3 provided on function plate 60. Since the working load of tension spring 41 may be increased by the counter-clockwise direction rotation of spring lever 43, tension band 35 is in close contact with supply reel 35 so that tension of supply reel 32 actuated by tension band 35 is increased. First take-up reel brake unit 50 and second take-up reel brake unit 55 may be located on designated positions so that their braking forces are not applied to the take-up reel 33.

Figure 6:
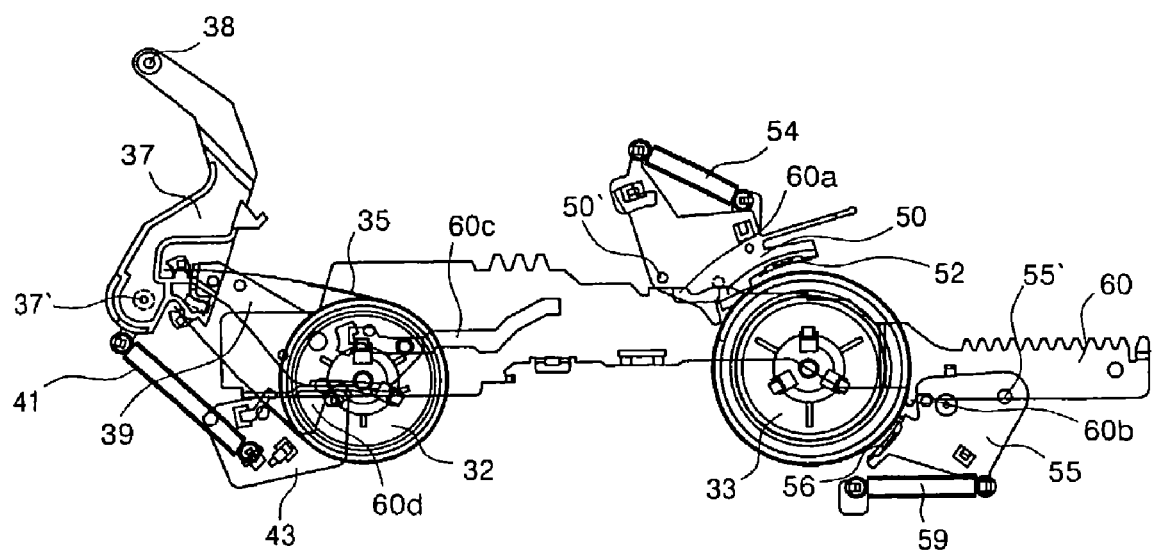
FIG. 6 is an exemplary schematic view showing an operational condition of reel brake mechanism in a standard play mode of a magnetic tape.

Exemplary FIG. 6 relates to standard play mode (e.g., a recording mode or a reproducing mode). In standard play mode, tension hand 35 may serve to uniformly maintain the tension of tape (T). Friction members 52 and 56 of first take-up reel unit 50 and second take-up reel brake unit 55 may not be in contact with take-up reel 33. In order to maintain this condition, cams 60c and 60d may be provided on function plate 60 to rotate spring lever 43 in a counter-clockwise direction by driving a loading motor. Accordingly, tension spring 41 may be expanded for uniformly maintaining the tension of tape M by tension band 35. Cams 60a and 60b may be provided on function plate 60 to rotate first take-up reel brake unit 50 and second take-up reel brake unit 55 around rotational axes 50' and 55' in a counterclockwise direction against the elastic force of brake springs 54 and 59, thereby separating friction members 52 and 56 from take-up reel 33.

Exemplary FIG. 3 relates to FF mode or REW mode of reel brake mechanism of embodiments of the present invention. In FF mode or REW mode, tension band 35 may be maintained so that tension band 35 is not in contact with supply reel 32, thereby freely rotating supply reel 32. Compared to the exemplary embodiments illustrated in FIG. 6, spring lever 43 of FIG. 3 rotates in a clockwise direction and changes the length of tension spring 41. In other words, tension spring 41 is slightly constricted.

First take-up reel brake unit 50 and second take-up reel brake unit 55 may be maintained so that friction members 52 and 56 are not in contact with take-up reel 33, thereby freely rotating take-up reel 33. Compared to FIG. 6, the location of function plate 60 in FIG. 3 is moved toward the right. In this condition, tape (T) within a tape cassette may be run forward or backward so as to be wound.

Figure 7:
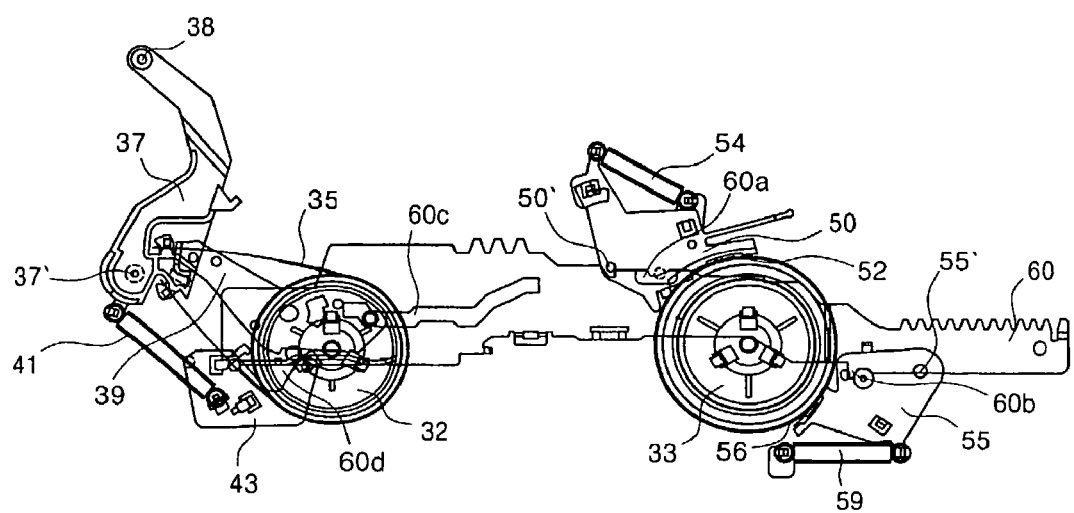
FIG. 7 is an exemplary schematic view showing an operational condition of the reel brake mechanism at an early stage of a FF (Fast Forward) or REW (Rewind) mode of a magnetic tape.

As illustrated in FIG. 7, at an early stage of a REW mode (or a later stage of a FF mode), an amount of tape (T) wound on take-up reel 33 is more than an amount of tape cm wound on supply reel 32. In embodiments, during a stop operation, function plate 60 may move from the condition in FIG. 3 to the condition illustrated in FIG. 7. The movement to the condition illustrated in FIG. 7 may be accomplished by a loading motor. Tension lever 39 may be driven by cam 60c, thereby rotating tension arm 37 and bringing tension band 35 into close contact with the outer circumference of supply reel 32 to generate a braking force.

As friction members 52 and 56 contact the outer circumference of take-up reel 33, first take-up reel brake unit 50 and second take-up reel brake unit 55 may generate braking forces by braking springs 54 and 59, in accordance with movement of function plate 60. Cam 60a3 may be provided on function plate 60 to contact downward protrusion 50a of first take-up reel brake unit 50. Cam 60b2 may be provided on function plate 60 contact downward protrusion 55a of second take-up reel brake unit 55. Accordingly, brake forces of first take-up reel brake unit 50 and second take-up reel brake unit 55 may be actuated on take-up reel 33.

Strength of a braking force applied to take-up reel 33 by first take-up reel brake unit 50 and second take-up reel brake unit 55 is larger than that of a braking force applied to supply reel 32 by tension band 35. One reason for this is that an amount of tape m wound on take-up reel 33 is more than an amount of tape m wound on supply reel 32. Accordingly, an inertial force of take-up reel 33 is larger than an inertial force of supply reel 32.

Figure 8:
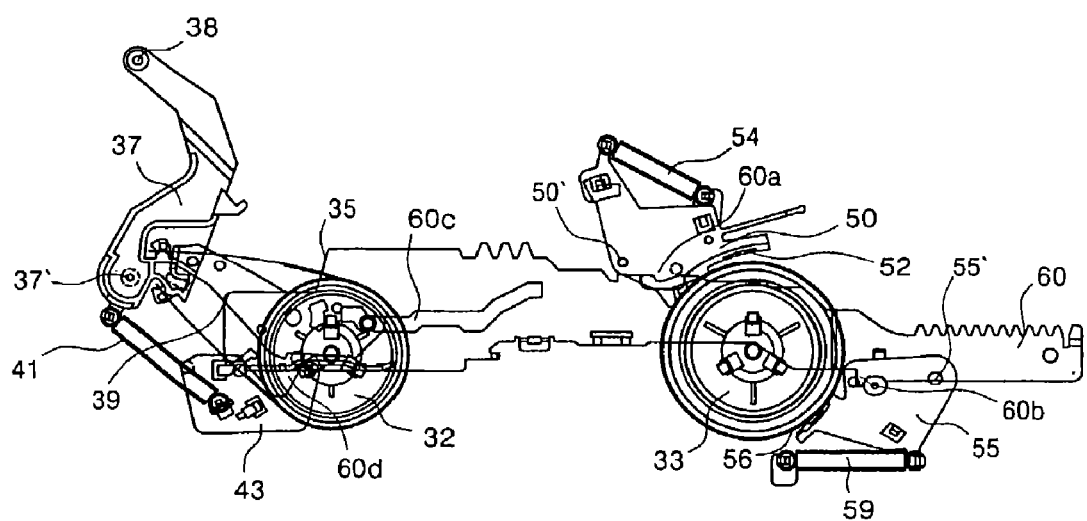
FIG. 8 is an exemplary schematic view showing an operational condition of the reel brake mechanism at a later stage of the FF (Fast Forward) or REW Rewind) mode of a magnetic tape.

At later stage of REW mode (or at an early stage of FF mode), an amount of tape (T) wound on supply reel 32 is more than an amount of tape (T) wound on take-up reel 33. In these circumstances, braking motion is achieved as illustrated in exemplary FIG. 8. When a stop signal is supplied at a later stage of REW mode, function plate 60 may be moved from a condition illustrated in FIG. 3 to a condition illustrated in FIG. 8. Tension lever 39 may be driven by cam 60c, thereby rotating tension arm 37 and bringing tension band 35 into close contact with the outer circumference of supply reel 32 to generate a braking force.

Cam 60b2 may be provided on function plate 60 to contact downward protrusion 55a of second take-up reel brake unit 55, so that friction member 56 contacts the outer circumference of take-up reel 33, to generate a braking force. First take-up reel brake unit 50 may not be operated since cam 60a2 contacts downward protrusion 50a of first take-up reel brake unit 50. Accordingly, a braking force of tension band 35 is larger than a braking force of second take-up reel brake unit 55, thereby effectively stopping rotation of supply reel 32 with a relatively large inertial force.

Embodiments of the present invention provide a reel brake mechanism which applies different braking forces to a supply reel and a take-up reel. The application of different braking forces is in accordance with inertial forces applied due to different amounts of tape wound on the supply reel and the take-up reel when a FF mode or REW mode is stopped. Accordingly, tape wound on a reel with a larger amount of the tape is prevented from being unwound during a stop operation. Embodiments of the present invention prevent tape wound on a reel with a relatively smaller amount of the tape from being pulled into the other reel with the relatively larger amount of the tape by the inertial force of the other reel, thereby reducing operating noise and damage to the tape. Embodiments of the present invention brakes a supply reel using only a tension band, thereby reducing the number of mechanical parts and lowering production cost.

Embodiments of the present invention prevent a tape from being unwound from a reel in a reel brake mechanism in a magnetic tape recording and/or reproducing apparatus, even though the FF or REW operation is stopped. Embodiments of the present invention protect a tape from any impact or damage generated in stopping the FF or REW operation in a reel brake mechanism in a magnetic tape recording and/or reproducing apparatus.

In embodiments of the present invention, a reel brake mechanism in a magnetic tape recording and/or reproducing apparatus runs a tape by a driving force of a driving source, in which a tape cassette containing the tape is mounted on a supply reel and a take-up reel installed on a main chassis, comprising: a supply reel brake unit for applying a braking force to the supply reel and controlling a rotational speed of the supply reel; a spring lever for selectively changing an elastic force applied to the supply reel brake unit so as to adjust the braking force of the supply reel brake unit; a first take-up reel brake unit and a second take-up reel brake unit for supplying a braking force to the take-up reel by selectively bringing one terminals of the first and second take-up reel brake units into close contact with the take-up reel in accordance with the amounts of the tape wound on the supply reel and the take-up reel; and a function plate provided with cams for operating the supply reel brake unit, the spring lever, and the first and second take-up reel brake units.

In embodiments, the braking force of the second take-up reel brake unit may be smaller than the braking force of the supply reel brake unit applied to the supply reel in the FF or REW mode and the same as or larger than the braking force of the first take-up reel brake unit, and the total sum of the braking forces of the first and second take-up reel brake units may be larger than the braking force of the supply reel brake unit in the FF or REW mode. In embodiments, the larger force of the two braking forces respectively applied to the supply reel and the take-up reel may be applied to either reel with a relatively larger amount of the tape wound thereon. In embodiments, the supply reel brake unit may be a tension band wound on the outer circumference of the supply reel at a designated length, both terminals of the tension band may be connected to a tension arm, and the tension arm may be rotated by a tension lever driven by the cams of the function plate and achieves a braking motion of the tension band.

In embodiments of the present invention, there is provided a reel brake method used in a reel brake mechanism in which a tape cassette containing a tape is mounted on a supply reel and a take-up reel installed on a main chassis, the tape is run by a driving force of a driving source, a supply reel brake unit applies a braking force to the supply reel, and first and second take-up reel brake units apply a braking force to the take-up reel wherein the larger force of the two braking forces respectively applied to the supply reel and the take-up reel is applied to either reel with a relatively larger inertial force in accordance to the amounts of the tape respectively wound each of the two reels.

In embodiments, the braking force of the supply reel brake unit applied to the supply reel may be larger than the braking force of the second take-up reel brake unit, the braking force of the second take-up reel brake unit may be the same as or larger than the braking force of the first take-up reel brake unit, and the total sum of the braking forces of the first and second take-up reel brake units may be larger than the braking force of the supply reel brake unit. In embodiments the present invention, when the tape running at more than 500 times-speed in the FF or REW mode is stopped, in the magnetic tape recording and/or reproducing apparatus, the unwinding of the tape from the reels, a noise generation, and a damage on the tape are prevented.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. An apparatus comprising:
    a first reel engagement portion being configured to engage with a first reel;
    a second reel engagement portion being configured to engage with a second reel;
    a first brake with a first brake force, wherein the first brake is configured to be selectively coupled to the first reel engagement portion;
    a second brake with a second brake force, wherein the second brake is configured to be selectively coupled to the first reel engagement portion; and
    a third brake with a third brake force, wherein the third brake is configured to selectively couple to the second reel engagement portion, wherein the sum of the first brake force and the second brake force is greater than the third brake force.

2. The apparatus of claim 1, wherein the first reel engagement portion is configured to engage with a take-up reel.

3. The apparatus of claim 2, wherein the take-up reel is a reel of a cassette.

4. The apparatus of claim 3, wherein the cassette is a videocassette.

5. The apparatus of claim 1, wherein:
    the first reel is a take-up reel; and
    the second reel is a supply reel.

6. The apparatus of claim 1, wherein the first brake and the second brake are configured to both selectively couple to the first reel if more media is on the first reel than the second reel.

7. The apparatus of claim 6, wherein the first brake and the second brake are configured to selectively couple to the first reel at substantially the same time.

8. The apparatus of claim 1, wherein only one of the first brake and the second brake is configured to selectively couple to the first reel if more media is on the second reel than the first reel.

9. The apparatus of claim 1, wherein:
    the selective coupling of the first brake and the first reel engagement portion exerts a first friction force;
    the selective coupling of the second brake and the first reel engagement portion exerts a second friction force; and
    the selective coupling of the third brake and the second reel engagement portion exerts a third friction force.

10. The apparatus of claim 1, wherein:
    the selective coupling of the first brake and the first reel engagement portion exerts a first friction force;
    the selective coupling of the second brake and the first reel engagement portion exerts a second friction force; and
    the first friction force is greater than the second friction force.

11. The apparatus of claim 10, wherein only the first brake is configured to selectively couple to the first reel if more media is on the second reel than the first reel.

12. The apparatus of claim 1, wherein:
    the first brake is driven by a first cam;
    the second brake is driven by a second cam;
    the third brake is driven by a third cam; and
    the first cam, the second cam, and the third cam are rigidly attached.

13. A method comprising:
    detecting an amount of media on a first reel and a second reel;
    selectively applying at least one member chosen from a first brake and a second brake to a first reel according to the detected amount of media on the first reel and the second reel, wherein the selectively applying comprises applying only the first brake to the first reel if more media is detected on the second reel than the first reel.

14. The method of claim 13, wherein the selectively applying comprises applying both the first brake and the second brake to the first reel if more media is detected on the first reel than the second reel.

15. The method of claim 13, wherein the media is tape.

16. The method of claim 13, wherein the friction force of the first brake is greater than the friction force of the second brake.

17. The method of claim 13, comprising selectively applying a third brake to the second reel, wherein the sum of the friction force of the first brake and the friction force of the second brake is greater than the friction force of the third brake.

18. A reel brake mechanism in a magnetic tape recording and/or reproducing apparatus for running a tape by a driving force of a driving source, in which a tape cassette containing the tape is mounted on a supply reel and a take-up reel installed on a main chassis, said reel brake mechanism comprising:
    a supply reel brake unit for applying a braking force to the supply reel and controlling a rotational speed of the supply reel;
    a first take-up reel brake unit and a second take-up reel brake unit for supplying a braking force to the take-up reel by selectively bringing terminals of the first and second take-up reel brake units into close contact with the take-up reel in accordance with the amounts of the tape wound on the supply reel and the take-up reel; and a function plate provided with cams for operating the supply reel brake unit, and the first and second take-up reel brake units.

19. The reel brake mechanism in a magnetic tape recording and/or reproducing apparatus as set forth in claim 18, wherein the braking force of the second take-up reel brake unit is smaller than the braking force of the supply reel brake unit applied to the supply reel in the FF or REW mode and the same as or larger than the braking force of the first take-up reel brake unit, and the total sum of the braking forces of the first and second take-up reel brake units is larger than the braking force of the supply reel brake unit in the REW mode.

20. The reel brake mechanism in a magnetic tape recording and/or reproducing apparatus as set forth in claim 19, wherein the larger force of the two braking forces respectively applied to the supply reel and the take-up reel is applied to either reel with a relatively larger amount of the tape wound thereon.

21. The reel brake mechanism in a magnetic tape recording and/or reproducing apparatus as set forth in claim 20, wherein the supply reel brake unit is a tension band wound on the outer circumference of the supply reel at a designated length, both terminals of the tension band are connected to a tension arm, and the tension arm is rotated by a tension lever driven by the cams of the function plate and achieves a braking motion of the tension band.

22. The reel brake mechanism of claim 18, further comprising a spring lever for selectively changing an elastic force applied to the supply reel brake unit so as to adjust the braking force of the supply reel brake unit.

23. A reel brake method used in a reel brake mechanism in which a tape cassette containing a tape is mounted on a supply reel and a take-up reel installed on a main chassis, the tape is run by a driving force of a driving source, a supply reel brake unit applies a braking force to the supply reel, and first and second take-up reel brake units apply a braking force to the take-up reel, wherein the larger force of the two braking forces respectively applied to the supply reel and the take-up reel is applied to either reel with a relatively larger inertial force in accordance to the amounts of the tape wound on two reels.

24. The reel brake method as set forth in claim 23, wherein the braking force of the supply reel brake unit applied to the supply reel is larger than the braking force of the second take-up reel brake unit, the braking force of the second take-up reel brake unit is the same as or larger than the braking force of the first take-up reel brake unit, and the total sum of the braking forces of the first and second take-up reel brake units is larger than the braking force of the supply reel brake unit.

25. A method comprising:

detecting an amount of media on a first reel and a second reel;

selectively applying at least one member chosen from a first brake and a second brake to a first reel according to the detected amount of media on the first reel and the second reel, wherein the selectively applying comprises applying both the first brake and the second brake on the first reel than the second reel.

* * * * *